(12) United States Patent
Jezewski et al.

(10) Patent No.: US 6,382,350 B1
(45) Date of Patent: May 7, 2002

(54) MOLDED ACOUSTIC AND DECORATIVE MATS AND METHODS FOR FORMING THE SAME

(75) Inventors: Michael C. Jezewski, East Sparta; Milton D. Lenarz, Magnolia; David M. Muckley, Uniontown; Maureen R. Putt, Canton; Steven G. Sehmer, North Canton, all of OH (US)

(73) Assignee: Collins & Aikman Products Corp., Charlotte, NC (US)

( * ) Notice: Subject to any disclaimer, the term of this patent is extended or adjusted under 35 U.S.C. 154(b) by 0 days.

(21) Appl. No.: 09/824,540

(22) Filed: Apr. 2, 2001

(51) Int. Cl.$^7$ ................................................ E04B 1/82
(52) U.S. Cl. ...................... 181/290; 181/291; 181/292; 181/293
(58) Field of Search ................................ 181/290, 284, 181/291–293

(56) References Cited

U.S. PATENT DOCUMENTS

| | | | |
|---|---|---|---|
| 1,908,917 A | * 5/1933 | Phillips | 428/491 |
| 1,935,302 A | 11/1933 | Waite | 2/278 |
| 2,113,128 A | * 4/1938 | Cunnington | 428/171 |
| 2,116,771 A | * 5/1938 | Seaman | 428/153 |
| 2,296,502 A | 9/1942 | Cotterman | 156/222 |
| 2,939,179 A | 6/1960 | Penman et al. | 264/243 |
| 3,014,829 A | 12/1961 | Curtin | 154/49 |
| D194,347 S | 1/1963 | Gerber | D9/6 |
| D200,295 S | 2/1965 | Lea | D9/6 |
| 3,703,424 A | 11/1972 | Charnock et al. | 156/272 |
| 3,804,699 A | 4/1974 | Johnson | 161/39 |
| 3,821,065 A | 6/1974 | Copeland et al. | 161/67 |
| 3,953,631 A | 4/1976 | Gordon | 264/243 |
| 4,016,318 A | 4/1977 | DiGioia et al. | 428/95 |

(List continued on next page.)

FOREIGN PATENT DOCUMENTS

| | | | |
|---|---|---|---|
| DE | 2619361 | 4/1976 | ........... A47G/27/04 |
| EP | 0259795 A2 | 9/1987 | ............ B60N/3/04 |
| EP | 0351041 A2 | 1/1990 | ........... A47G/27/02 |
| GB | 1325203 | 8/1973 | ........... A47G/27/00 |
| GB | 2171901 | 9/1986 | ........... A47G/27/02 |
| JP | 59-14813 | 1/1984 | ........... A47G/27/02 |
| JP | 1-223909 | 9/1989 | ........... A47G/27/02 |
| JP | 4-112833 | 4/1999 | |
| WO | WO 86/06691 | 11/1986 | ............. B60N/3/04 |

OTHER PUBLICATIONS

J.C. Whitney Catalog No. 515J, p. 96, Mat No. 1 of 4 Piece Carpet mat Set, Bottom Center of Page.
J.C. Whitney Catalog No. 515T, p. 97, Plush Carpet Mat No. 1, Lower Left Center of Page and Customer–tailored Carpet Mat No. 3, Left Center of Page.
English Translation of *Manufacturing Method of Rug Mats*, Japanese Patent Application No. 59–14813, dated Jan. 25, 1984.
English Translation of A *Manufacturing Method of Carpet Mats*, Japanese Patent Application No. 59–14813, dated Jan. 25, 1984.
English Translation of *Presentation of Publications and Others*, Japanese Patent Application No. 4–112,833, dated Apr. 12, 1999.
English Translation of *Mat and Method for Manufacturing Same*, Japanese Patent Application No. 1–223,909.

*Primary Examiner*—Shih-Yung Hsieh
(74) *Attorney, Agent, or Firm*—Myers Bigel Sibley & Sajovec

(57) ABSTRACT

A multi-layer acoustically absorptive mat includes a base layer having an exposure hole defined therein. A face layer is disposed adjacent the base layer. An acoustic absorbing layer is interposed between the base layer and the face layer. The acoustic absorbing layer includes an exposed portion extending across the exposure hole wherein the base layer is bonded to the acoustic absorbing layer.

40 Claims, 14 Drawing Sheets

U.S. PATENT DOCUMENTS

| | | | |
|---|---|---|---|
| 4,143,194 A | 3/1979 | Wihksne | 428/81 |
| 4,174,991 A | 11/1979 | Reuben | 156/242 |
| 4,230,755 A | 10/1980 | Morris | 423/95 |
| 4,361,614 A | 11/1982 | Moffitt, Jr. | 428/138 |
| 4,382,986 A | 5/1983 | Reuben | 428/88 |
| 4,399,176 A | 8/1983 | Bell et al. | 428/85 |
| 4,465,720 A | 8/1984 | Bell et al. | 428/85 |
| 4,479,992 A | 10/1984 | Häeseker et al. | 428/116 |
| 4,529,639 A | 7/1985 | Peoples, Jr. et al. | 428/95 |
| 4,557,970 A | 12/1985 | Holtrop et al. | 428/316.6 |
| 4,563,378 A | 1/1986 | Roth | 428/86 |
| 4,579,764 A | 4/1986 | Peoples, Jr. et al. | 428/95 |
| 4,609,580 A | 9/1986 | Rockett et al. | 428/297 |
| 4,673,603 A | 6/1987 | Roth | 428/85 |
| 4,715,473 A * | 12/1987 | Tschudin-Mahrer | 181/286 |
| 4,721,641 A | 1/1988 | Bailey | 428/88 |
| 4,733,997 A | 3/1988 | Ford et al. | 264/138 |
| 4,748,063 A | 5/1988 | Reuben | 428/78 |
| 4,749,602 A | 6/1988 | Russell | 428/99 |
| 4,751,764 A | 6/1988 | Reuben | 16/8 |
| 4,758,457 A | 7/1988 | Altus | 428/82 |
| 4,828,898 A | 5/1989 | Bailey | 428/88 |
| 4,835,030 A | 5/1989 | Squier et al. | 428/88 |
| 4,938,677 A | 7/1990 | Robbins, III | 264/151 |
| 4,973,505 A | 11/1990 | Bielous | 428/44 |
| D313,789 S | 1/1991 | Thundercloud | D12/203 |
| 5,019,197 A | 5/1991 | Henderson | 156/212 |
| 5,071,614 A | 12/1991 | Grace | 264/243 |
| 5,128,189 A | 7/1992 | Bartlett | 428/71 |
| 5,154,961 A | 10/1992 | Reuben | 428/82 |
| 5,171,619 A | 12/1992 | Reuben | 156/72 |
| 5,289,904 A * | 3/1994 | Harrison | 188/73.1 |
| D348,646 S | 7/1994 | Reuben | D12/203 |
| 5,362,544 A | 11/1994 | Reuben | 428/82 |
| 5,410,111 A * | 4/1995 | Stief et al. | 181/286 |
| 5,620,546 A | 4/1997 | Reuben | 156/219 |
| 5,876,826 A | 3/1999 | Hoffmann et al. | 428/95 |
| RE36,677 E | 5/2000 | Reuben | 156/219 |

* cited by examiner

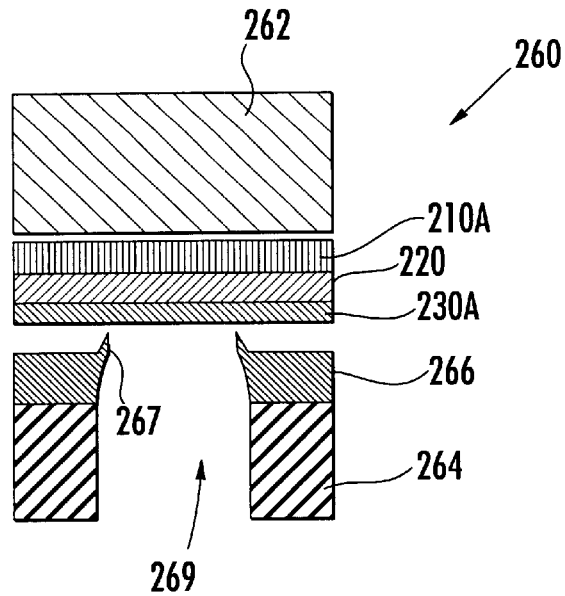
FIG. 10.
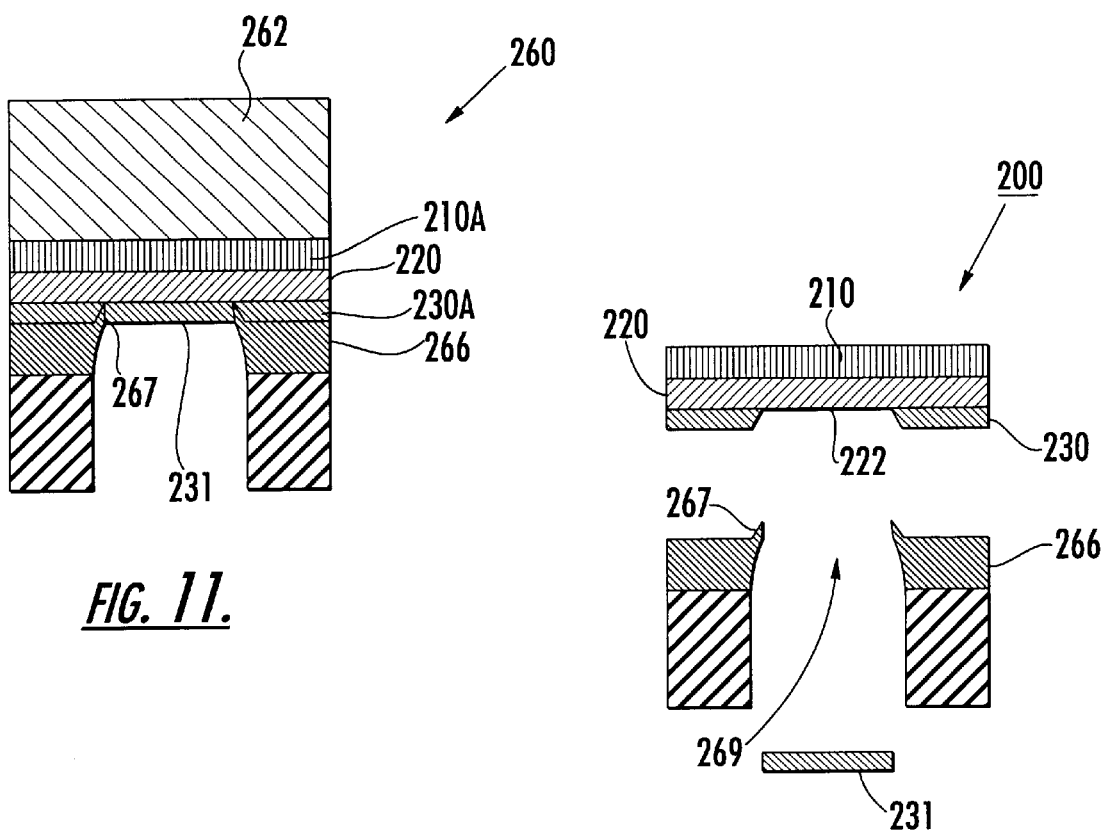
FIG. 11.
FIG. 12.

MOLDED ACOUSTIC AND DECORATIVE MATS AND METHODS FOR FORMING THE SAME

FIELD OF THE INVENTION

The present invention relates to mats such as automotive accessory floor mats and, more particularly, to molded mats.

BACKGROUND OF THE INVENTION

It is often desirable to minimize environmental noise. For example, it may be desirable to reduce noise levels in the interior of an automobile in order to improve the comfort of occupants. Sources of such noise may include or be affected by road surface, tire construction, drivetrain noise, exhaust noise, chassis and suspension noise, wind noise and the like. Automobile manufacturers have expended substantial effort and expense to reduce cabin noise.

SUMMARY OF THE INVENTION

According to embodiments of the present invention, a multi-layer acoustically absorptive mat includes a base layer having an exposure hole defined therein. A face layer is disposed adjacent the base layer. An acoustic absorbing layer is interposed between the base layer and the face layer. The acoustic absorbing layer includes an exposed portion extending across the exposure hole wherein the base layer is bonded to the acoustic absorbing layer.

According to further embodiments of the present invention, a multi-layer mat includes a first layer having an exposure hole defined therein. A second layer is disposed adjacent the first layer. A decorative layer is interposed between the first layer and the second layer. The decorative layer includes an exposed portion extending across the exposure hole. The first layer is bonded to the decorative layer.

According to method embodiments of the present invention, a method for forming a multi-layer acoustically absorptive mat includes providing a moldable base layer, a face layer and an acoustic absorbing layer. The acoustic absorbing layer is placed between the base layer and the face layer. The base layer is joined to the acoustic absorbing layer such that the base layer is bonded to the acoustic absorbing layer and an exposed portion of the acoustic absorbing layer extends across an exposure hole in the base layer.

According to further method embodiments of the present invention, a method for forming a multi-layer mat includes providing a moldable first layer, a second layer and a decorative layer. The decorative layer is placed between the first layer and the second layer. The first layer is joined to the decorative layer such that the first layer is bonded to the decorative layer and an exposed portion of the decorative layer extends across an exposure hole in the first layer.

According to embodiments of the present invention, an apparatus for forming a multi-layer mat having a first layer and a second layer, the first layer having an exposure hole therein and the second layer including an exposed portion extending across the exposure hole, includes a mold plate defining a cavity configured to receive the exposed portion. An upstanding ridge is adapted to separate the first layer from the exposed portion when the first layer is plasticized. The upstanding ridge may be adapted to sever a slug from a first layer insert as the first layer insert is being bonded to the second layer.

Objects of the present invention will be appreciated by those of ordinary skill in the art from a reading of the figures and the detailed description of the preferred embodiments which follow, such description being merely illustrative of the present invention.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 10 is a schematic, cross-sectional view of inserts and a molding apparatus for forming the mat of FIG. 6, wherein the molding apparatus is shown in a pre-molding position;

FIG. 11 is a schematic, cross-sectional view of the inserts and apparatus of FIG. 10, wherein the molding apparatus is shown in a molding position;

FIG. 12 is a schematic, cross-sectional view of the mat of FIG. 6 and a portion of the molding apparatus of FIG. 10;

DETAILED DESCRIPTION OF EMBODIMENTS OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the figures, layers, components or regions may be exaggerated for clarity.

As discussed below, while various surfaces and orientations are identified herein as "upper" and "lower" for convenience and clarity, the mat is not limited in applicability to the orientation shown and such surfaces and orientations may properly be referred to as "inner" and "outer", for example.

Figure 1:
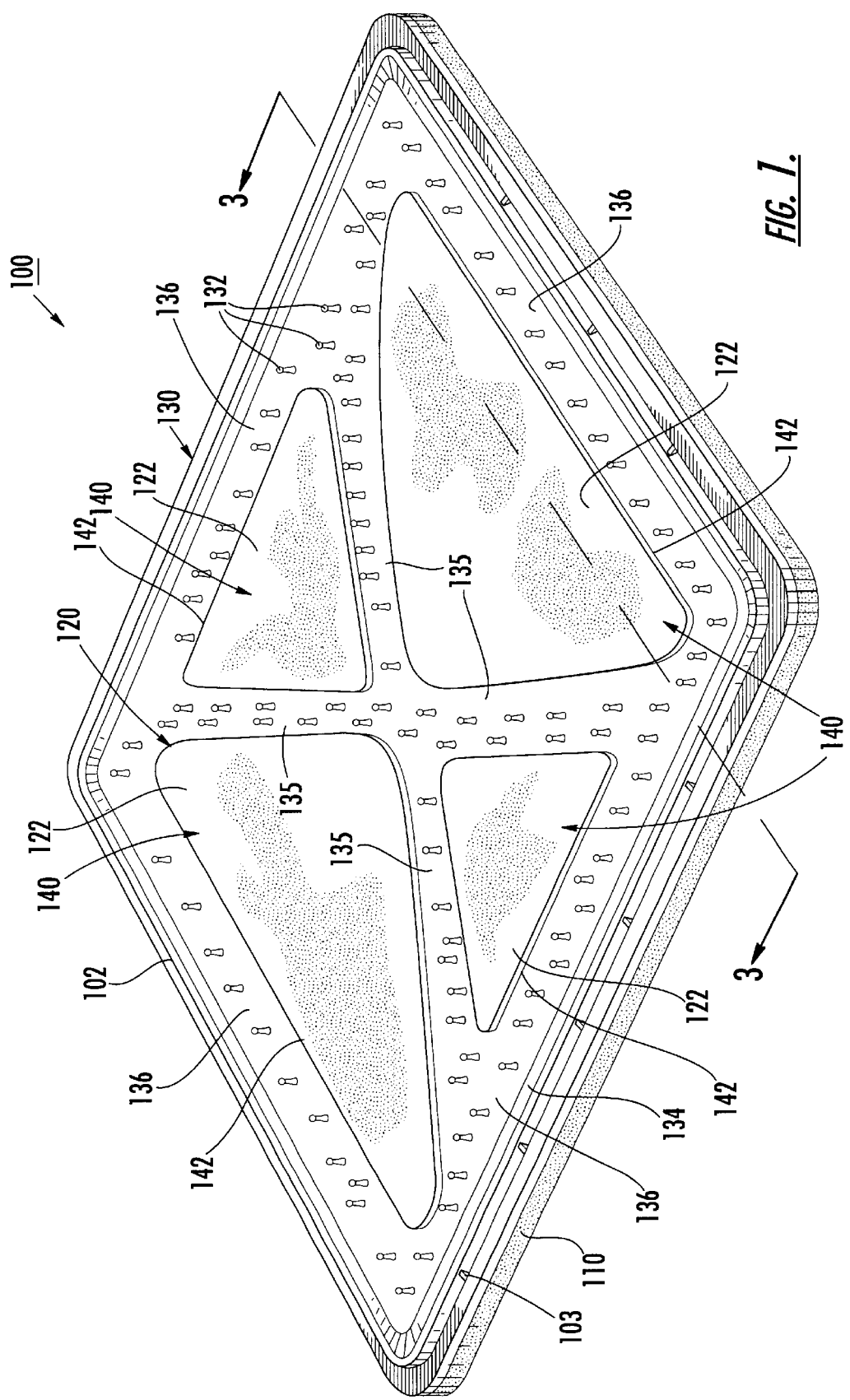
FIG. 1 is a bottom, perspective view of an acoustic absorbing mat according to embodiments of the present invention.
Figure 2:
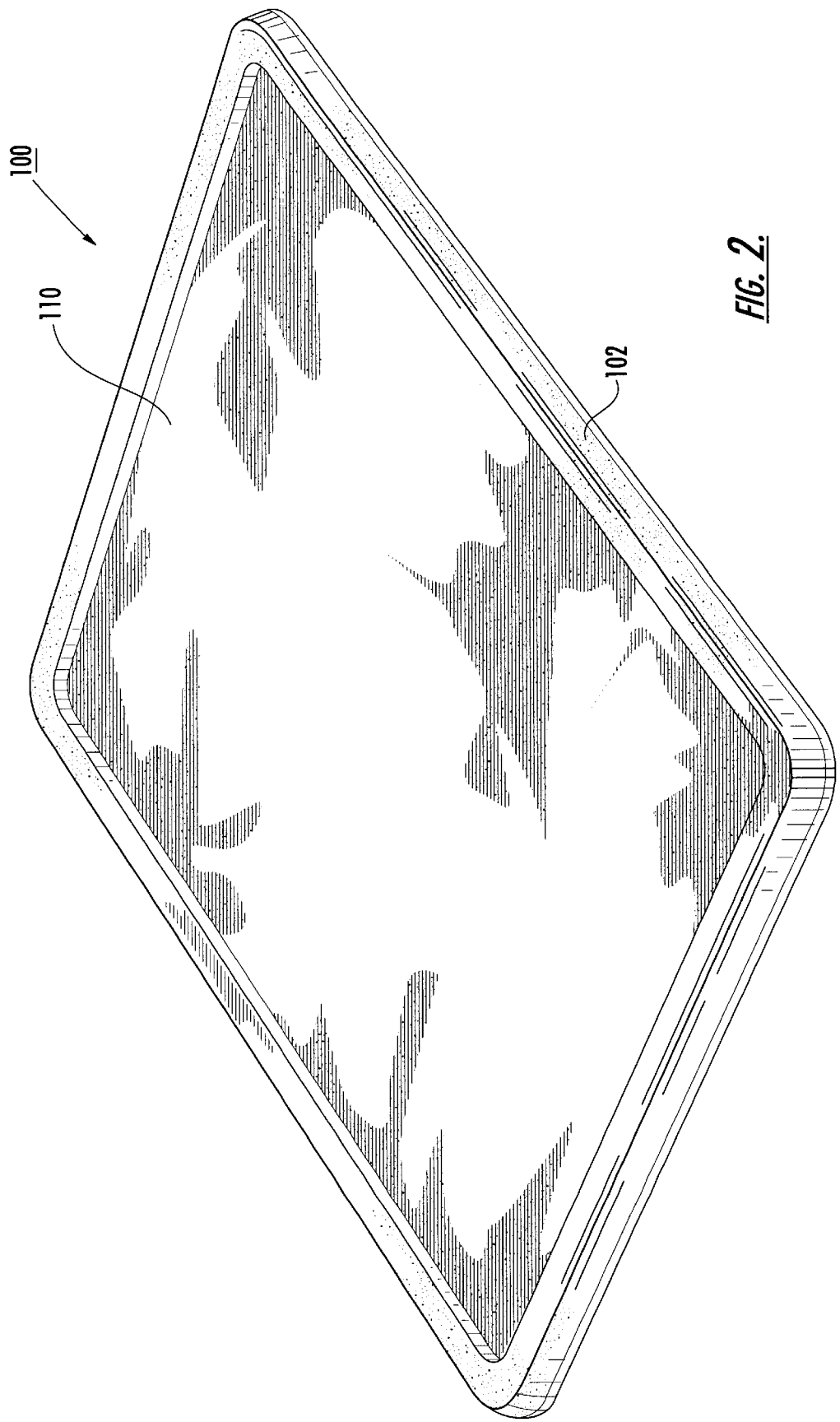
FIG. 2 is a top, perspective view of the mat of FIG. 1.
Figure 3:
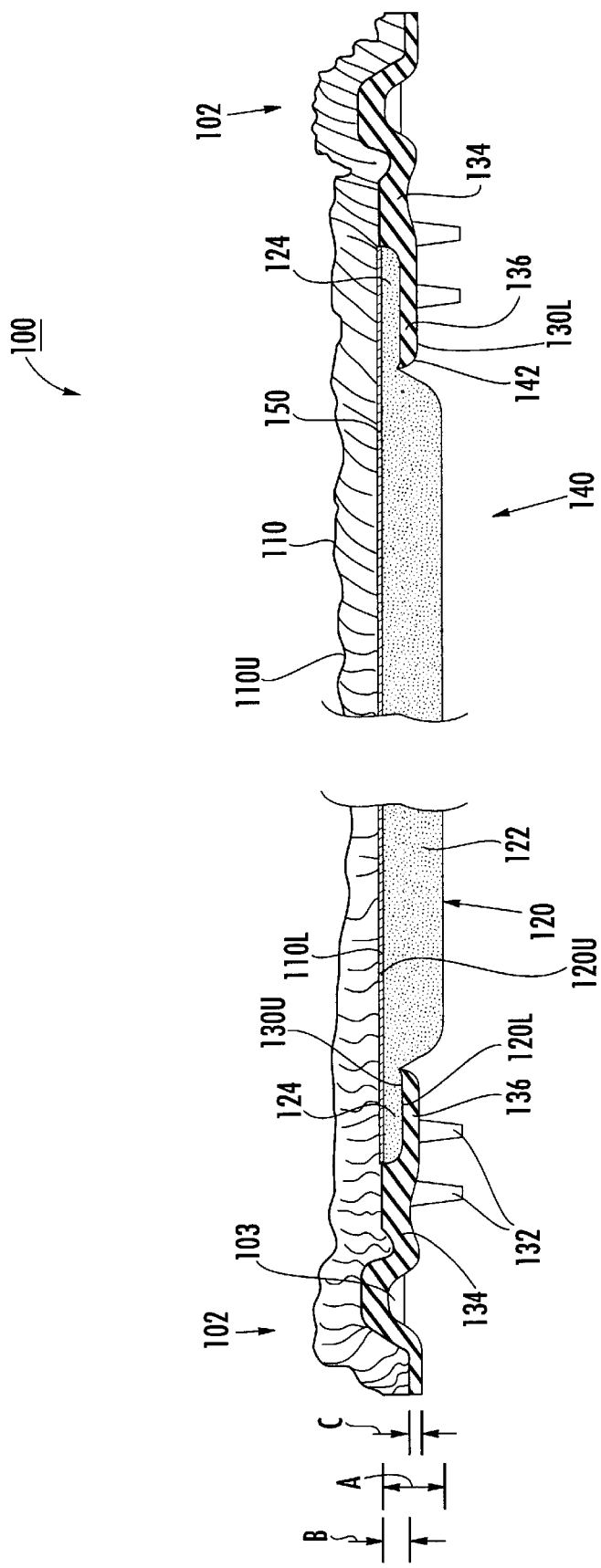
FIG. 3 is a cross-sectional view of the mat of FIG. 1 taken along the line 3—3 of FIG. 1.

With reference to FIGS. 1–3, a mat according to embodiments of the present invention is shown therein and generally designated by the number 100. The mat 100 may be, for example, an automobile interior floor or cargo mat. Preferably, the mat 100 is pliable. As used herein, the term "pliable" means that the mat may be easily folded or flexed. For example, a pliable floor mat can be rolled up and, when held at arm's length, is unable to support its own weight. Alternatively, the mat 100 may be rigid and may retain a three-dimensional shape. The mat 100 includes an upper face layer 110, a lower base layer 130 and an acoustic absorbing layer 120 sandwiched between the layers 110 and 130. A layer of adhesive 150 (FIG. 3) adheres an upper surface 120U of the layer 120 to a lower surface 110L of the face layer 110. The construction of the several layers and the overall construction of the mat 100 will be discussed hereinbelow in greater detail.

The face layer 110 preferably is formed from carpet material which is wear-resistant and has a pleasing appearance. It will be apparent to one skilled in the art that the face layer 110 can alternatively be an elastomer layer, a thermoplastic layer, such as a vinyl compound, or a non-woven layer. The carpet material may be tufted, woven, needle punched or the like, and may be backed or unbacked. Preferably, the carpet material is a looped pile carpet or a tufted pile carpet construction, i.e., a plurality of pile yarns extend through a primary backing to form loops which are, in the case of a tufted pile carpet, cut to form tufts. The fibers of the pile yarns can be composed of natural or synthetic fibers and may be thermoplastic or thermosetting. Suitable carpet fibers are described in U.S. Pat. No. 4,174,991 to Reuben, the disclosure of which is incorporated herein by reference in its entirety, and include polyamnide fibers such as nylon fibers, particularly nylon 6 and nylon 66, polyester fibers, acrylic fibers, polypropylene and blends and copolymers thereof. Additionally, the face layer 110 may include multiple sheets of carpet, for example, a multiple sheet, embroidered, pre-punched carpet. Alternatively, the face layer 110 may be formed of woven or knit fabric, non-woven carpet, or any other suitable material.

The base layer 130 is preferably formed of a heat curable elastomeric material or a thermoplastic material. Exemplary heat curable elastomeric materials include vulcanizable elastomers which are cured by a sulfur reaction mechanism or a metallic oxide mechanism. Particularly suitable elastomeric materials are rubbers such as natural rubber, butadiene polymers and copolymers such as styrene-butadiene rubbers and polybutadiene rubbers, isoprene polymers and copolymers, chloroprene rubbers such as neoprene, nitrile rubbers, butyl rubbers, and ethylene-propylene rubbers, and blends and copolymers thereof. Styrene-butadiene rubbers are particularly preferred for use in the present invention. Suitable thermoplastic materials include polyvinyl chloride, polyethylene, ethylene vinyl acetate, polypropylene, polystyrene, thermoplastic rubber, thermoplastic olefins, and styrene butadiene block copolymers.

The acoustic absorbing layer 120 is formed of a sound absorbing material that exhibits good acoustic absorption characteristics (i.e., effectively absorbs acoustic energy). Preferably, the material of the layer 120 exhibits superior acoustic absorption as compared to the material of the base layer 130. Preferably, the material of the layer 120 has a normal incidence sound absorption coefficient of at least 0.05 at 250 Hz and at least 0.15 at 1000 Hz as determined in accordance with The American Society of Tests and Materials (ASTM) standard test procedure E 1050, "Impedance and Absorption of Acoustical Materials Using a Tube, Two Microphones, and a Digital Frequency Analysis System". Preferably, the normal incidence sound absorption coefficient does not fall below 0.70 above 5000 Hz.

Preferred materials for the layer 120 include open cell, polyether Apolyurethane foam, polypropylene and polyethylene. Other suitable materials may include reticulated foams, natural, synthetic or glass fiber batt, non-woven carpet, micro-fiber layer or foamed latex.

The acoustic absorbing layer 120 may be formed of a flexible urethane resin layer comprising an elastomeric flexible thermoset urethane resin, and may be a chemically blown or frothed foam layer. Such resin compositions may have the usual additives, and typically are composed of isocyanate materials, such as an aromatic diisocyanate, such as polyphenyl polymethylene polyisocyanate; e.g., a diphenylmethane diisocyanate present in a crude MDI-reaction mixture, reacted together with suitable polyols, such as vinyl-capped polymeric polyols like styrene-capped polymers, alone or in combination with other polyols, such as polyether polyols derived from the reaction of polyfinctional alcohols with propylene and/or with ethylene oxides. Other additives may be used, such as a catalyst like an organo-metal catalyst or amines, water-scavenging agents, such as molecular sieves, calcium sulfate and the like, plasticizers, fillers, flame retardants, pigments, blowing agents, surfactants, amines, such as tertiary amine, silicones, and other additives and modifiers typically employed in the preparation of flexible urethane thermoset solvent foam layers.

The layer 120 may comprise any thermoplastic urethane resin which is moldable; for example, above 150° F., and suitable for the purposes of preparing a moldable automobile mat. Such thermoplastic urethane resins typically comprise a long-chain polymer with minimized cross-linking. Suitable and typical urethane thermoplastic resins, based upon the employment of aliphatic polyisocyanates, are well-known and are described, for example, in *Polyurethanes: Chemistry and Technology*, Sanders and Frisch, Interscience Publishing Co., 1964, Vol. 2, pages 379–409, herein incorporated by reference.

Preferably, the layer 120 is air permeable with an airflow resistance value of at least 200 Rayls as measured in accordance with ASTM C522-87, "Standard Test Method for Airflow Resistance of Acoustic Materials," and water-resistant. The layer 120 is a continuous layer (see FIG. 4). The acoustic absorbing layer 120 may be formed of a material that has, prior to molding into the mat 100, portions of different densities through its thickness and/or across its width and/or length. The layer 120 may have a color different from or contrasting with the color of the layer 130.

The acoustic absorbing layer 120 may include two or more layers of acoustic absorbing material as described above. The acoustic absorbing layers may have the same or different properties and dimensions. The acoustic absorbing layers may be adhered, bonded, punched, stitched or otherwise secured to one another.

With reference to FIG. 3, preferably, the substantial entirety of the upper surface 120U of the acoustic absorbing layer 120 is adhered to the lower surface 110L of the face layer 110 by the adhesive 150. The adhesive 150 may be a hot melt or pressure-sensitive adhesive, for example. Suitable adhesives include, for example, Dow Intergral 899 or 917 hot melt adhesive available from Dow Chemical of Midland, Mich., or Spunfab VI6010 hot melt adhesive available from Spunfab Adhesive Fabrics of Ohio.

The base layer 130 may be integrally formed. As best seen in FIGS. 1 and 3, the base layer 130 has a peripheral border 134 that is bonded directly to the lower surface 110L of the face layer 110. The face layer 110 and the base layer 130 may optionally include a channeled edge section 102 as described in U.S. Pat. No. 5,620,546 to Reuben, the disclosure of which is hereby incorporated herein by reference in its entirety. The base layer 130 further includes a portion 136 that circumscribes the entire periphery of the acoustic absorbing layer 120 such that a peripheral portion 124 (FIG. 3) of the layer 120 is captured between the upper surface of the portion 136 and the lower surface 110L of the face layer 110. Additionally, cross portions 135 of the base layer 130 extend across the mat 100. The portions of the layer 120 overlying the cross portions 135 are likewise captured between the upper surfaces of the portions 135 and the lower surface of the face layer 110. A plurality of nibs 132 are integrally formed with and extend downwardly from the base layer 130.

The upper surfaces 130U of the portions 136 and 135 of the base layer 130 are bonded to the lower surfaces 120L of the overlying portions of the layer 120. As illustrated, the portions of the layer 120 captured between the base layer 130 and the face layer 110 are partially compressed. However, these portions of the layer 120 may be non-compressed or less compressed than illustrated.

The base layer portions 135, 136 define openings 140 in the base layer 130. As illustrated, portions 122 of the acoustic absorbing layer 120 extend downwardly through the openings 140. However, the layers 120 and 130 may be formed such that the portions 122 do not extend beyond the openings 140. Preferably, and as illustrated, the portions 122 are non-compressed or less compressed than the portions captured between the base layer portions 135, 136 and the face layer 110. The edges of the base layer 130 about the openings 140 are configured to provide channels 142 surrounding the portions 122.

Preferably, the exposed acoustic absorbing layer portions 122 constitute at least 25 percent of the total lower surface area of the mat 100. More preferably, the portions 122 constitute between about 5 and 50 percent of the lower surface area of the mat 100. With reference to FIG. 3, the thickness A of the exposed portions 122 is preferably between about 0 and 10 mm. The thickness B of the portions 124 and the portions of the layer 120 overlying the base layer portions 135 is between about 0 and 3 mm. The base layer portions 135, 136 preferably have a nominal thickness C of between about 1 and 2 mm. Preferably, the exposed portions 122 extend downwardly below the lower surface 130L of the base layer 130 between about 0 and 7 mm.

Preferably, the mat 100 has a normal incidence sound absorption coefficient of at least 0.1 at 250 Hz and 0.6 at 1000 Hz as determined in accordance with ASTM standard test procedure E 1050. Preferably, the normal incidence sound absorption coefficient of the mat 100 does not fall below 0.6 above 1000 Hz.

The mat 100 may be tunable to provide desired acoustic absorptive properties for different environments. The mat 100 may be tuned by appropriate selection of the thickness, density, cell size, fiber type, and/or other suitable characteristics of the acoustic absorbing layer 120, as well as the dimensions of the holes 140 (and, thereby, the dimensions of the exposed portions 120). The characteristics of the face layer 110 may be varied and selected to assist in tuning the acoustics of the mat 100. The mat 100 may be incorporated into a tuned acoustic control system including other acoustic absorbing or sound deadening elements such as, for example, floor coverings, headliners, dash covers and the like.

In use, the mat 100 may be placed in a desired location, for example, the floor of an automobile, such that the lower surfaces of the acoustic absorbing layer portions 122 and the base layer portions 134, 135, 136 face downwardly and engage the vehicle floor while the upper surface 110U of the face layer 110 faces upwardly. While the mat 100 has been described herein as a floor mat and with reference to "upper" and "lower" for convenience, it will be appreciated that the mat 100 and each of the mats described herein may be positioned or installed such that the mat is suspended from a ceiling or vertical wall so that the upper and lower orientations are reversed. However, in any event, the mats are preferably positioned or-installed such that the face layer faces outwardly away from the adjacent surface (e., the ceiling, wall or floor) and the base layer faces toward said adjacent surface). Sounds emanating from or into the vehicle, particularly from below, can be absorbed, at least in part, by the acoustic absorbing layer 120. The integral construction of the mat 100, and in particular, the secure joinder between the layers 110, 120 and 130 can provide a durable mat 100. The mat 100 may be designed such that it is reversible so that the mat can be disposed with the face layer 110 facing the support surface and the base layer 130 facing outwardly.

Figure 4:
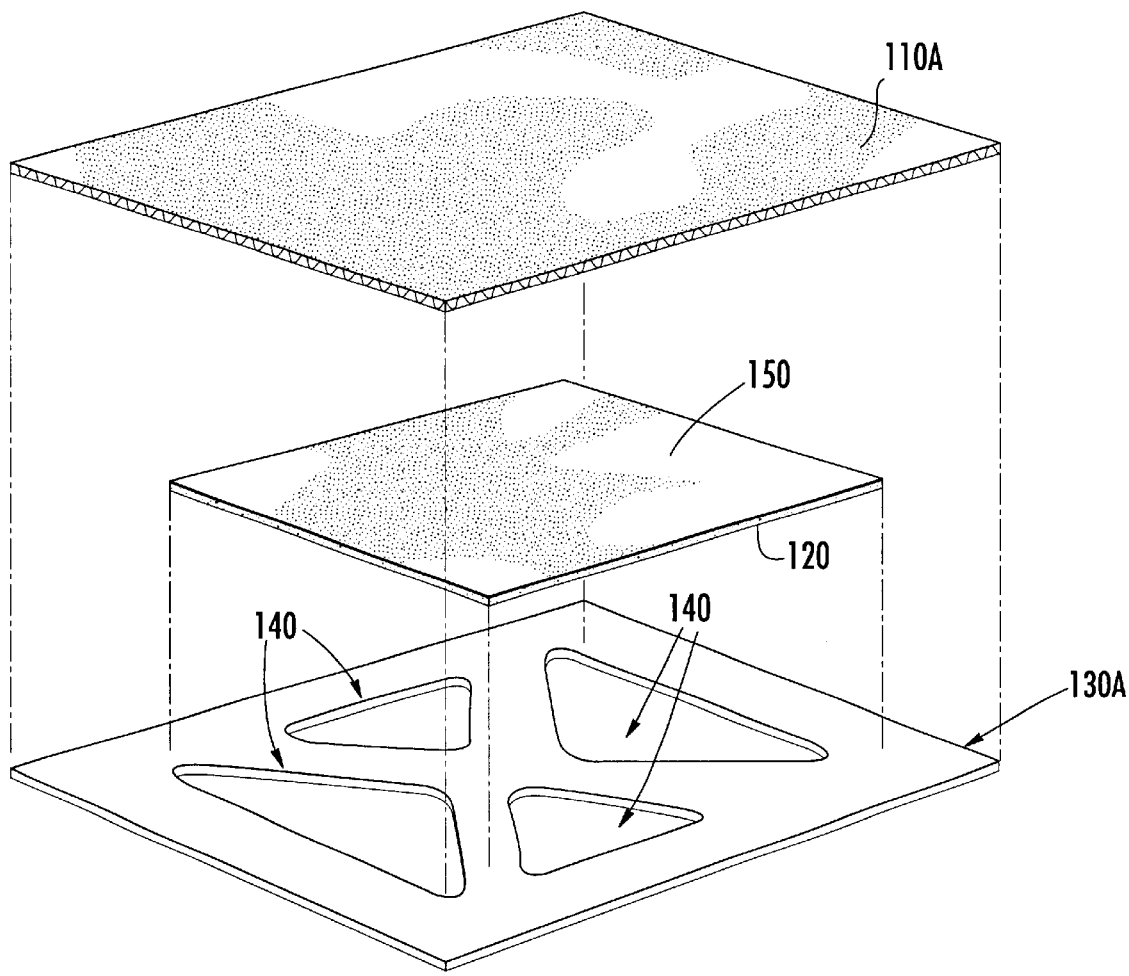
FIG. 4 is an exploded view of a face layer insert, an acoustic absorbing layer and a base layer insert for forming the mat of FIG. 1.
Figure 5:
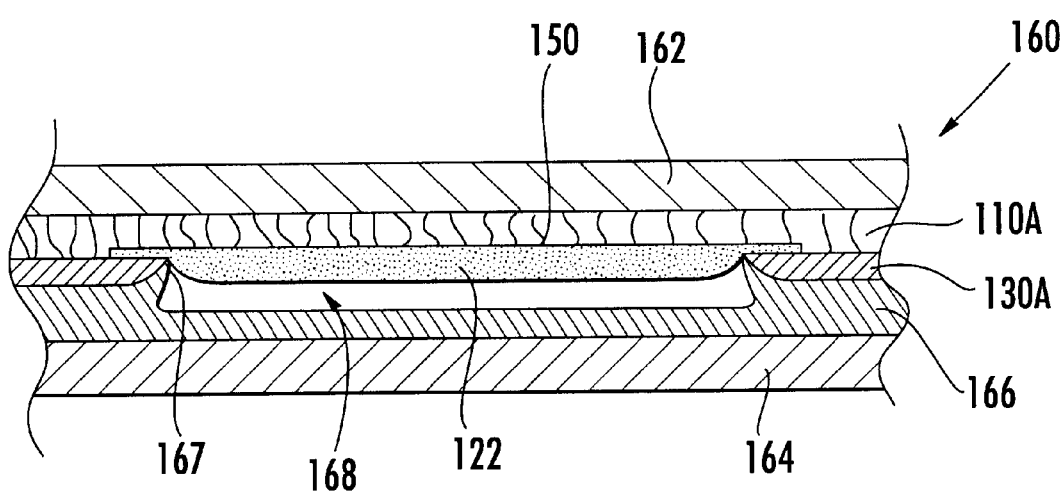
FIG. 5 is a partial, cross-sectional view of the face layer insert, the acoustic absorbing layer and the base layer insert of FIG. 4 disposed in a molding apparatus.

With reference to FIGS. 4 and 5, the mat 100 may be formed in the following manner using a molding apparatus 160 (FIG. 5). A sheet-like face layer insert 110A (corresponding to the face layer 110), the acoustic absorbing layer 120 and a sheet-like base layer insert 130A (corresponding to the base layer 130) are placed in the molding apparatus 160 (FIG. 5) in the relative orientations shown in FIG. 4. The insert 110A and the insert 130A are preferably somewhat larger than the layers 110 and 130 of the finished mat 100. The layer 120 (FIG. 4) is preferably of substantially the same size as in the finished mat 100. The holes 140 are pre-punched or otherwise pre-formed in the base layer insert 130A prior to insertion of the base layer insert 130A into the mold apparatus 160. As shown, the adhesive 150 may be pre-applied (ebb by flood coating) to the upper surface of the acoustic absorbing layer 120. Alternatively, the adhesive 150 may be preapplied to the lower surface of the face layer insert 11A.

Optionally, the acoustic absorbing layer 120 may be laminated to the face layer insert 110A prior to placement of these components in the mold apparatus 160 as described above. For example, the face and acoustic absorbing layer materials may be prelaminated in bulk. Blanks may be cut from the prelaminated face and acoustic absorbing layers and placed in the mold apparatus.

The mold apparatus 160 includes a hot mold plate 166 mounted on a carrier 164 and a cool mold plate 162. The bottom surface of the face layer insert 110A is contacted to the adhesive 150 and the upper surface of the base layer insert 130A. The portions 122 of the acoustic absorbing layer 120 are received in cavities 168 in the hot mold plate 166. The remainder of the layer 120 is contacted on its lower surface by the upper surface of the base layer insert 130A.

The inserts 110A, 130A and the layer 120 are then placed under a compressive molding pressure. Preferably, the compressive molding pressure (i.e., the pressure within the mold) is between about 100 and 1000 psi. A sufficient compressive molding pressure should be employed to achieve a bond between the bottom surface of the insert 110A and the upper surface of the insert 130A. Preferably, if the face layer insert 110A is a tufted pile carpet, the pile is temporarily crushed. The hot mold plate 166 is heated to a temperature sufficient to cause the base layer insert 130 to plasticize (i.e., to flow). Preferably, the temperature of the hot mold plate 166 is sufficient to cause the insert 130A to flow and cure. Where applicable, the temperature is preferably sufficient to vulcanize the rubber of the base layer insert 130A. Preferably, the insert 130A is heated to a temperature of between about 250 and 400° F. An upstanding ridge 167 circumscribes the periphery of each hole 140 and serves as a dam to prevent the material of the base layer insert 130A from flowing into the cavity 168, thereby forming the channels 142 of the finished mat 100.

As the insert 130A is heated and the layers 110, 120, 130 are under compression, the cool mold plate 162 is preferably cooled to a temperature below the temperature at which the face layer 110 or the acoustic absorbing layer 120 would become substantially permanently deformed. The heating of the insert 130A is maintained until the material thereof is cured. Suitable molding apparatus are generally described in U.S. Pat. No. 4,174,991 to Reuben, the disclosure of which is hereby incorporated herein by reference in its entirety, although molding techniques, particularly if thermoplastic materials are used, will be apparent to one skilled in the art.

The upper surface of the base layer insert 130A is thereby bonded to the engaging lower surfaces of the face layer insert 110A and the acoustic absorbing layer 120. Additionally, the hot melt or pressure adhesive 150 is activated by the temperature and/or compression to adhere the upper surfaces of the layer 120 with the engaging lower surfaces of the face layer insert 110A. The inserts 110A, 130A and the layer 120 are thereby molded into a unitary assembly. Upon cooling or while still hot, the unitary assembly may be removed from the mold apparatus 160 and trimmed to form the finished mat 100. If multiple mats are being formed from a common set of inserts 110A, 130A in the manner described below, the mats may be cut from the unitary assembly.

Figure 6:
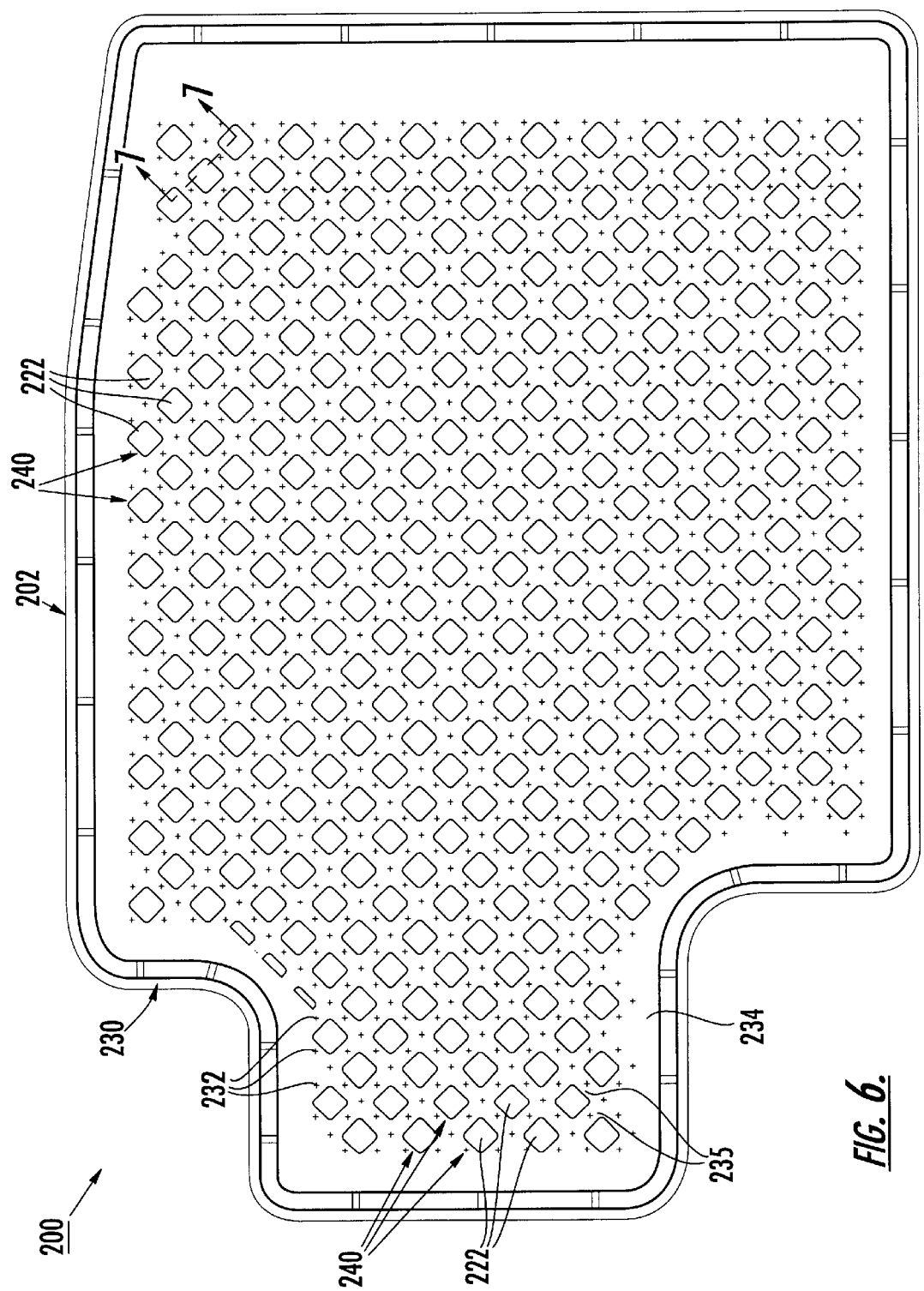
FIG. 6 is a bottom, plan view of a mat according to further embodiments of the present invention.
Figure 7:
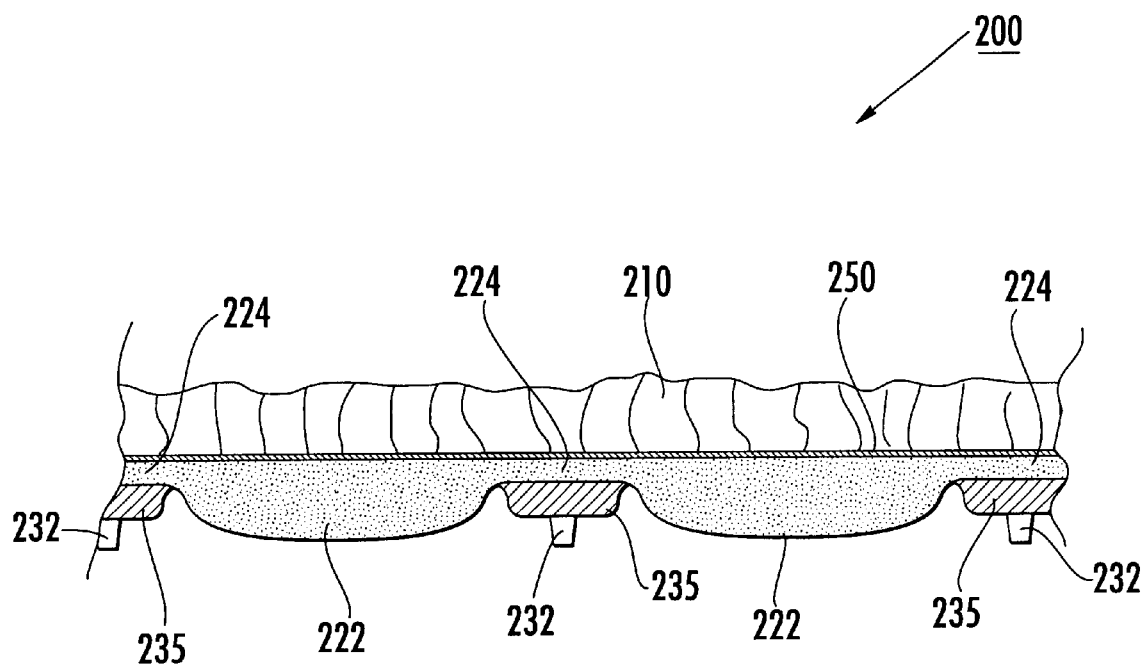
FIG. 7 is a partial, cross-sectional view of the mat of FIG. 6 taken along the line 7—7 of FIG. 6.

With reference to FIGS. 6 and 7, a mat 200 according to further embodiments of the present invention is shown therein. The mat 200 is shown in a different shape than the mat 100. However, it will be appreciated by those of skill in the art that any shape may be employed for the mat 100, the mat 200 or any of the other mats described herein or otherwise formed according to embodiments of the present invention. Moreover, holes 240 may have various shapes and configurations and are not linked to the illustrated embodiments. Optionally, the mat 200 includes an edge section 202 corresponding to the edge section 102.

The mat 200 includes elements 210, 220 (FIG. 12), 230, 232 (illustrated as cross-marks in FIG. 6 for clarity) and 250 (FIG. 7) corresponding to elements 110, 120, 130, 132 and 150, respectively, except as follows. In place of the holes 140, the base layer 230 has a plurality of smaller holes 240. Portions 222 of the acoustic absorbing layer 220 extend through the holes 240. The remaining portions 224 of the acoustic absorbing layer 220 are sandwiched between the face layer 210 and the peripheral, circumscribing portion 234 and a network of crossing portions 235 of the base layer 230.

Figure 8:
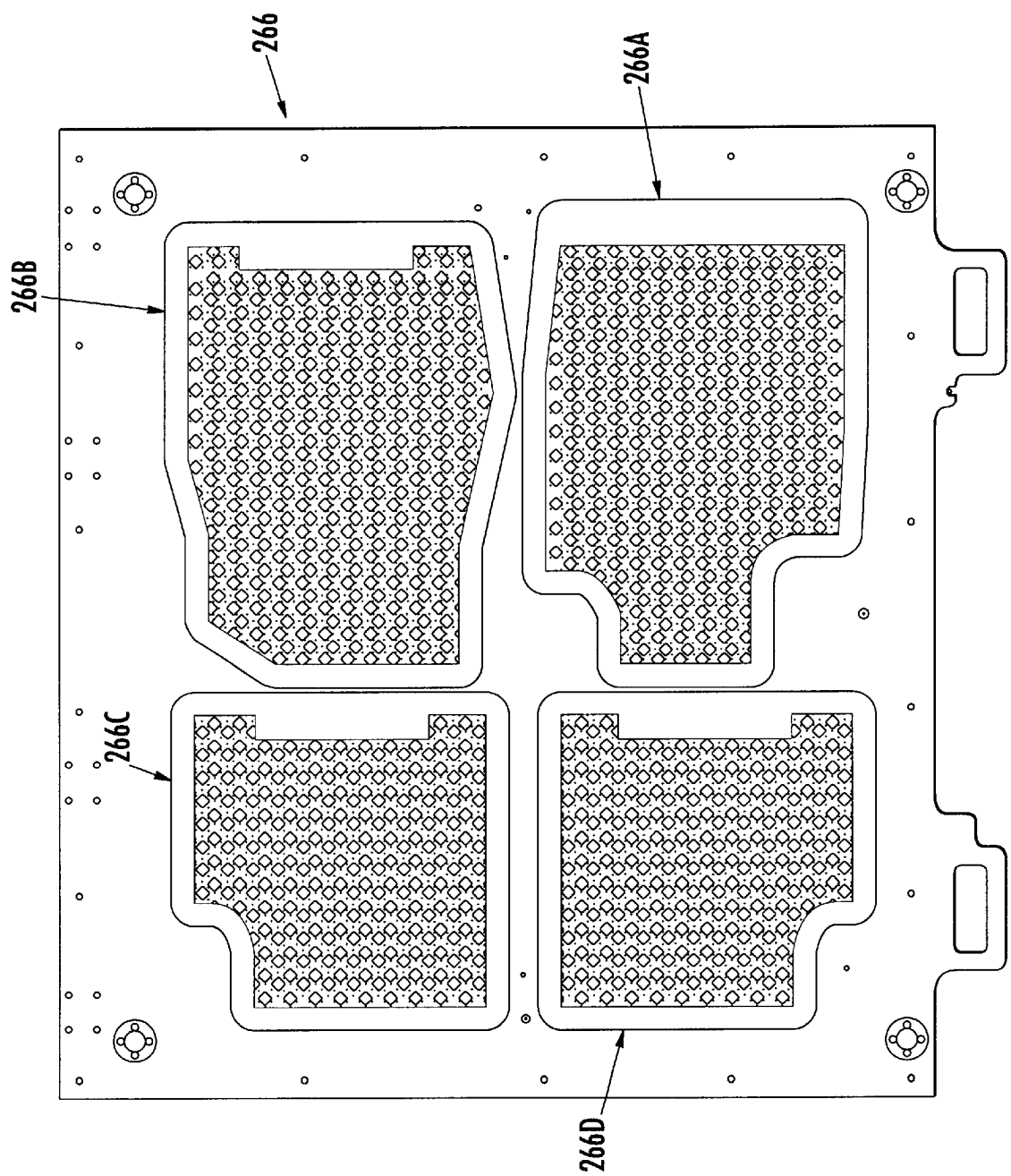
FIG. 8 is a top plan view of a mold plate for forming mats according to embodiments of the present invention including the mat of FIG. 6.

With reference to FIGS. 8–12, the mat 200 may be formed in the following manner. With reference to FIG. 8, a hot mold plate 266 for forming a plurality of mats according to embodiments of the present invention is shown therein. The hot mold plate 266 may be used in place of the hot mold plate 166 of the mold apparatus 160, for example. The hot mold plate 266 has sections 266A, 266B, 266C and 266D adapted to form four respective mats of varying shapes. The four mats may comprise a full set of accessory floor mats for a single automobile, for example. The section 266A is adapted to form the mat 200. The four mats may be formed by inserting a single face layer insert (e.g., corresponding to the face layer 210) of sufficient size to cover all of the sections 266A, 266B, 266C and 266D, a single base layer insert (corresponding to the base layer 230) sufficient to cover all of the sections 266A, 266B, 266C and 266D, and four discrete acoustic absorbing layers (e.g., corresponding to the acoustic absorbing layer 220) of the generally same dimensions as in the respective finished mats. The acoustic absorbing layers are placed over respective ones of the sections 266A, 266B, 266C and 266D.

Figure 9:
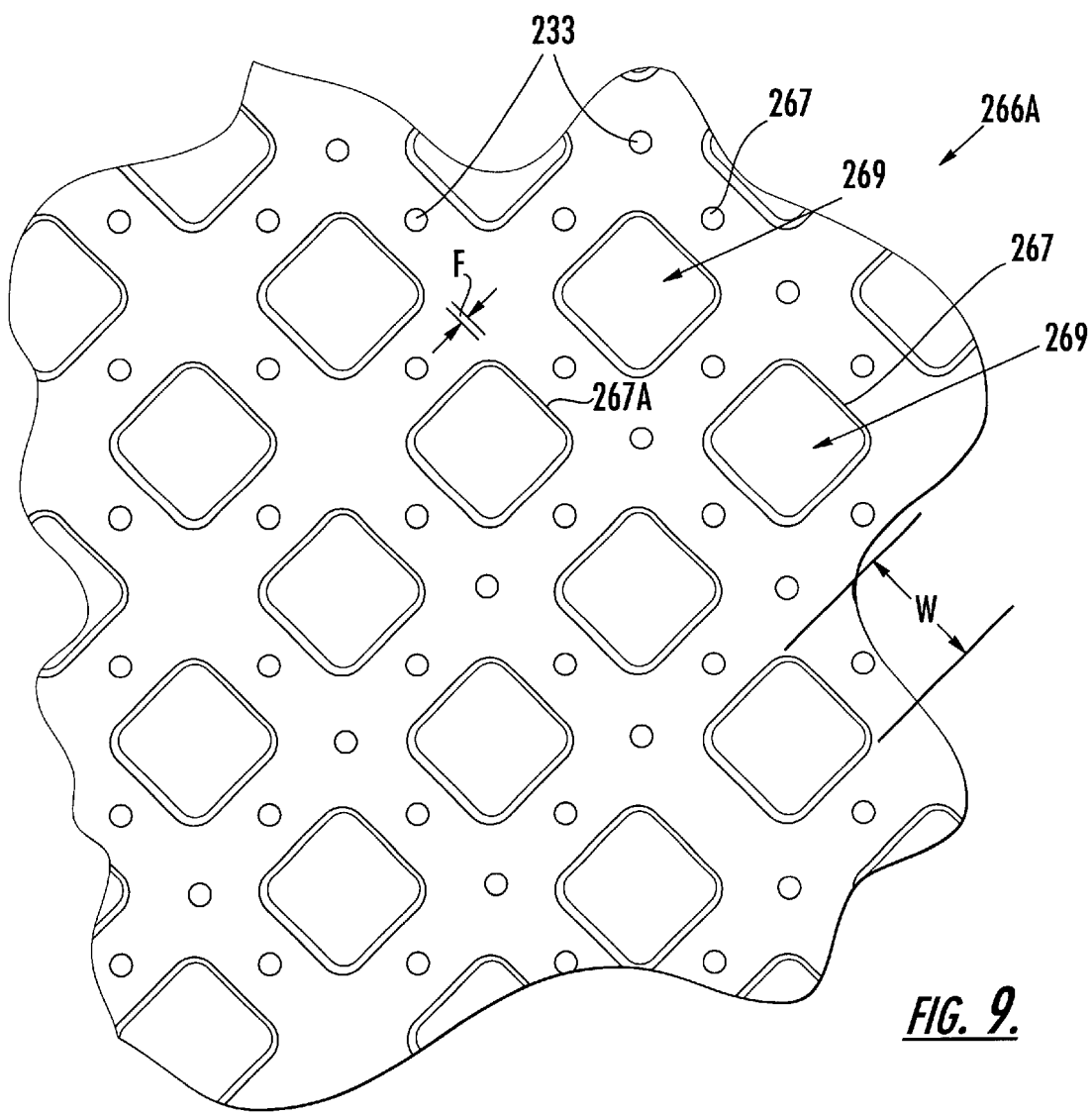
FIG. 9 is an enlarged, partial, top plan view of the mold plate of FIG. 8.

FIG. 9 illustrates an enlarged section of the mold plate section 266A. The mold plate section 266A includes a plurality of generally square holes 269. Preferably, each hole 269 has a width W along each side of between about 10 and 30 mm. Each hole 269 is surrounded by an upstanding ridge 267. Each ridge 267 has an upper flat 267A. Preferably, each flat 267A has a width F of between about 0.25 and 1 mm.

With reference to FIGS. 10–12, the mat 200 may be formed using the hot mold plate 266 in the same manner as described above with respect to the mold plate 166, except as follows. A mold apparatus 260 is provided including a carrier 264 and a cool mold plate 262 corresponding to the carrier 164 and the cool mold plate 162, respectively. The hot mold plate 266 is mounted on the carrier 264. As shown in FIG. 9, a base layer insert 230A is placed in the mold apparatus 260 with the acoustic absorbing layer 220 and a face layer insert 210A. The base layer insert 230A differs from the insert 130A in that no holes are pre-punched therein in the locations corresponding to the acoustic absorbing layer portions 222 of the finished mat 200.

With reference to FIG. 10, the mold apparatus 260 is then closed to compress the inserts 210A, 230A and the layer 220 in the manner described with respect to the mat 100 and the mold apparatus 160. As the base layer insert 230A is heated and compressed, the ridges 267 of the hot mold plate 266 are driven into contact with the lower surface of the layer 220. Each ridge 267 thereby severs a slug 231 from the remainder of the base layer insert 230A. After the base layer insert 230A is cured, a slug 231 at each location corresponding to the exposed portions 222 of the finished mat 200 will drop out (for example, as the mat 200 is removed from the hot mold plate 266) through the openings 269, or the slugs 231 may be removed manually or using a suitable tool or machine. The acoustic absorbing layer portions 222 are thereby exposed.

Figure 13:
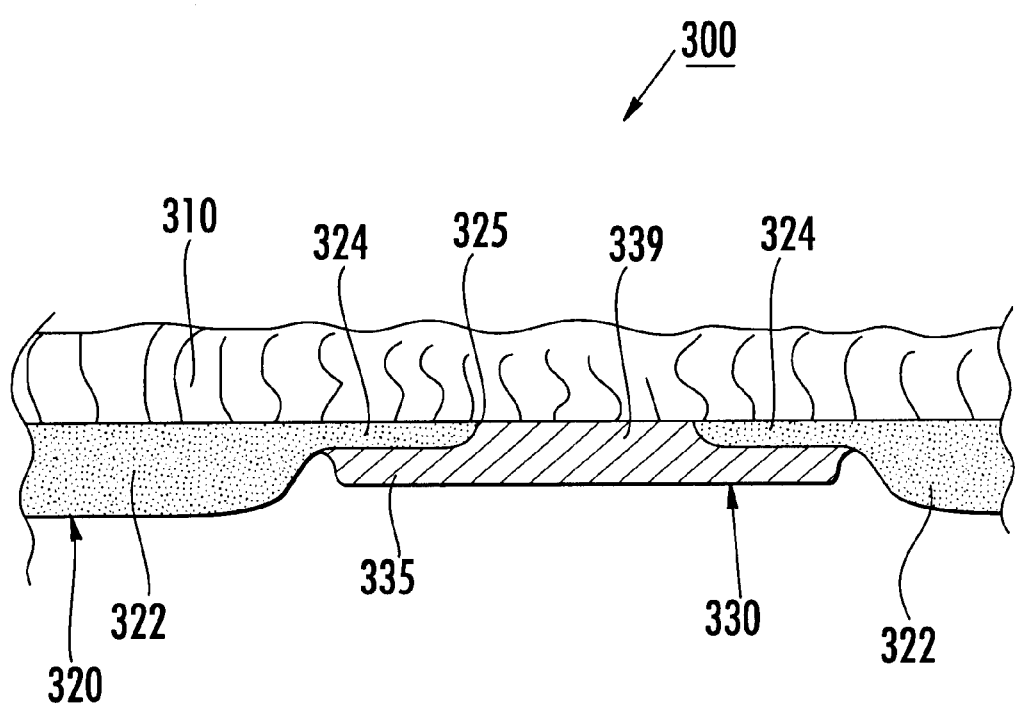
FIG. 13 is a partial, cross-sectional view of a mat according to further embodiments of the present invention.
Figure 14:
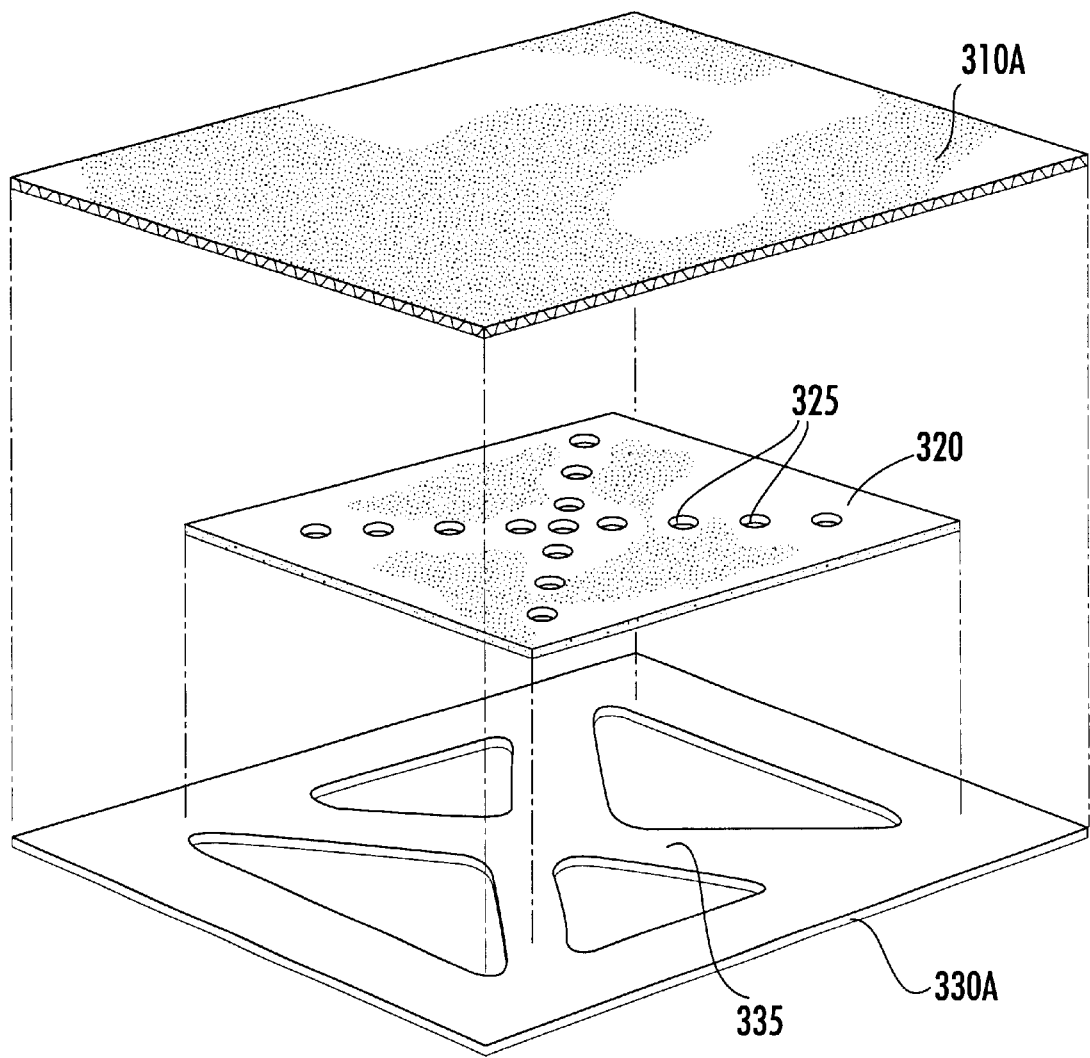
FIG. 14 is an exploded, perspective view of a face layer insert, an acoustic absorbing layer and a base layer insert for forming the mat of FIG. 13.

With reference to FIG. 13, a mat 300 according to further embodiments of the present invention is shown therein. The mat 300 includes elements 310, 320 and 330 corresponding to elements 110, 120 and 130, respectively, of the mat 100 except as follows. The mat 300 differs from the mat 100 in that portions 339 of the base layer 330 extend through holes 325 in the acoustic absorbing layer 320 and are directly bonded to the lower surface of the face layer 310. Other portions 335 of the base layer 330 are separated from the face layer 310 by portions 324 of the acoustic absorbing layer 320. Remaining portions 322 of the acoustic absorbing layer 320 are exposed through the base layer 330. The mat 300 may be formed in the manner described above with regard to the mat 100 using a face layer insert 310A, the layer 320 and a base layer insert 330A, as illustrated in FIG. 14. Adhesive corresponding to the adhesive 150 may, as illustrated, be omitted or may be provided between the layers 310 and 320.

Figure 15:
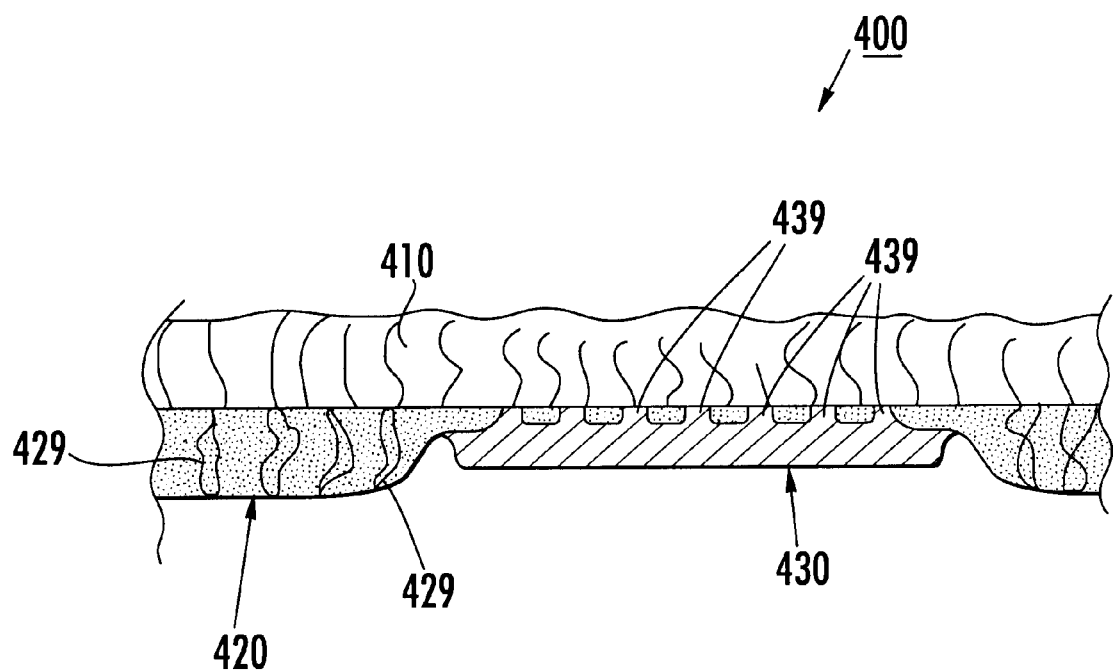
FIG. 15 is a partial, cross-sectional view of a mat according to further embodiments of the present invention.

With reference to FIG. 15, a mat 400 according to further embodiments of the present invention is shown therein. The mat 400 includes a face layer 410 and a base layer 430 corresponding to the layers 120 and 130, respectively. The mat 400 has an acoustic absorbing layer 420 formed of a material which, as formed, has a porosity that allows a portion of the base layer 430 to flow therethrough during the above-described molding process. More particularly, the construction of the acoustic absorbing layer 420 provides, without requiring a punching or like step, a plurality of passages 429 through which connecting portions 439 of the base layer 430 extend. The connecting portions 439 directly bond to the lower surface of the face layer 410 and thereby secure the base layer 430 to the face layer 410. The acoustic absorbing layer 420 may be formed of an open cell, reticulated foam. Alternatively, the layer 420 may be formed of a fibrous batt. Adhesive corresponding to the adhesive 150 may be, as illustrated, omitted or, optionally, may be provided between the layers 410 and 420.

Figure 16:
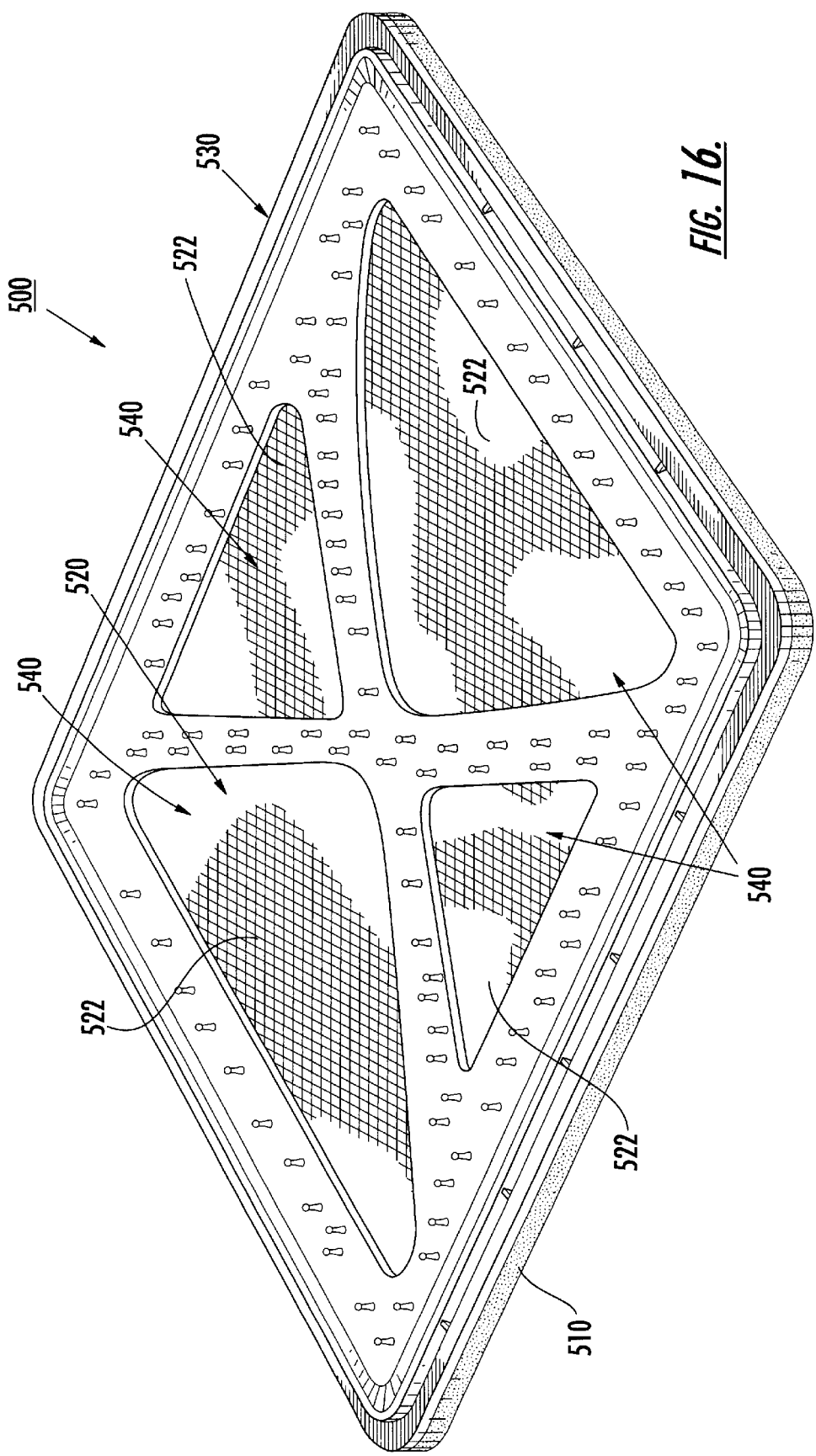
FIG. 16 is a bottom, perspective view of a decorative mat according to further embodiments of the present invention.

With reference to FIG. 16, a mat 500 according to further embodiments of the present invention is shown therein. The mat 500 includes a first layer 510 and a second layer 530 corresponding to the layers 110 and 130, respectively. In place of the acoustic absorbing layer 120, the mat 500 has a decorative layer 520 which may or may not be acoustically absorptive. The layer 520 includes portions 522 that are exposed through exposure holes 540 in the base layer 530.

The layer 520 may be any suitable layer which provides a desired decorative effect. For example, the layer 520 may be a tufted carpet, a non-woven fabric, a woven fabric, a knit fabric or a film. The decorative layer 520 may have a decorative pattern and/or a decorative texture on the exposed surfaces thereof. The decorative layer 520 preferably has the same relative width and length dimensions as the layer 120. The layer 520, depending on the selected material, may extend into or through the exposure holes 540.

The size, shape, number and arrangement of the exposure holes 540 may be selected to provide any desired decorative pattern. For example, the pattern of the exposure holes 240 (FIG. 6) may be used.

The layer 510 may be formed of any suitable and desired material. For example, the layer 510 may be formed of tufted carpet, rubber, fabric, film, or thermoset, thermoplastic or vinyl type compounds.

The mat 500 may be formed using any of the methods and apparatus described above, the decorative layer 520 being substituted for the acoustic absorbing layer in each case. In use, the mat 500 may be oriented such that either the layer 510 or the layer 530 faces outwardly (i.e., away from the supporting floor, wall or ceiling, for example). If the layer 510 is intended to face the supporting surface, the layer 510 is preferably formed of rubber or another material as described above for the base layer 130. The mat 500 may be reversible.

From review of the foregoing description, it will be appreciated by those of skill in the art that various aspects and steps of the foregoing mats and methods for forming the same may be additionally or otherwise combined. For example, mats according to the present invention may be formed having pre-punched holes in the base layer thereof corresponding to the holes 140 and also pre-punched holes in the acoustic absorbing layer corresponding to the holes 325, and/or the acoustic absorbing layer may be formed of a porous material suitable to provide connecting portions corresponding to the connecting portions 439. Similarly, mats may be formed in the manner described above with regard to the mat 200 but also including one or more of these features. Configurations and methods for combining the various method and product features and aspects described above will be apparent to those of skill in the art upon reading the description herein.

In each of the above-described mats, a sintered or extruded polyethylene or EVA (or other suitable polymer(s)) may be applied to the rear surface of the face layer in addition to or, preferably, in place of the adhesive (e.g., the adhesive 150). During the molding step, the coating material bonds the face and base layers to one another.

While in each of the mats 100–500 described above the acoustic absorbing layer is provided as an insert and is surrounded by a border wherein the face layer and the base layer are directly joined, the acoustic absorbing layer may be provided as a larger sheet (e.g., sufficient to form one or multiple mats) so that, in the finished mat, the acoustic absorbing layer extends to the edges of the mat. The side edges of the acoustic absorbing layer may be exposed at the edges of the mat. This construction may particularly lend itself to manufacture using prelaminated face and acoustic absorbing layers as described above.

The edges of the mats may be finished using techniques other than or in addition to the molded, channeled edge section (e.g., the edge section 102). This may be particularly desirable in embodiments wherein the acoustic absorbing layer extends to the edges of the mat. Suitable supplemental or alternative binding techniques include serging or binding with yarn or other material.

Retention means other than nibs (e.g., the nibs 132) may be provided in addition to or instead of the nibs. Such retention means include gronunets, clips, snaps, hook and loop fasteners (e.g., VELCRO™ fasteners), suction cups, magnets, and adhesive.

One or more additional layers may be provided between the acoustic absorbing layers and the face layers of the mats according to the present invention. The additional layer(s) may provide additional features or functionality such as increased stiffness or weight. The additional layer(s) may include a layer formed of an air permeable, water resistant material such as GORTEX™ fabric. The additional layer(s) may be secured to the acoustic absorbing layer in any of the manners described above for joining the acoustic absorbing layers to the face layer, and may be joined to the face layer by adhesive or any other suitable means.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A multi-layer acoustically absorptive mat comprising:
   a) a base layer having an exposure hole defined therein;
   b) a face layer disposed adjacent said base layer; and
   c) an acoustic absorbing layer interposed between said base layer and said face layer, said acoustic absorbing layer including an exposed portion extending across said exposure hole;
   d) wherein said base layer is bonded to said acoustic absorbing layer.

2. The mat of claim 1 wherein a connecting portion of said base layer is directly bonded to said face layer.

3. The mat of claim 2 wherein said connecting portion forms a border surrounding at least a portion of said acoustic absorbing layer.

4. The mat of claim 3 wherein said border includes an edge section defining a channel.

5. The mat of claim 2 including a connection hole in said acoustic absorbing layer, and wherein said connecting portion extends through said connection hole.

6. The mat of claim 2 wherein said acoustic absorbing layer is formed of a material defining a plurality of passages and said base layer includes a plurality of said connecting portions each extending through a respective one of said passages.

7. The mat of claim 1 including a layer of adhesive securing said acoustic absorbing layer to said face layer.

8. The mat of claim 1 wherein said base layer includes a plurality of exposure holes extending therethrough and said acoustic absorbing layer includes a plurality of exposed portions each extending across a respective one of said exposure holes.

9. The mat of claim 1 including a plurality of said exposure holes defined in said base layer and a plurality of said exposed portions of said acoustic absorbing each extending across a respective one of said exposure holes.

10. The mat of claim 1 wherein said exposed portion extends outwardly beyond said base layer.

11. The mat of claim 1 wherein a captured portion of said acoustic absorbing layer is compressed relative to said exposed portion.

12. The mat of claim 1 including a plurality of nibs extending outwardly therefrom and integrally molded with said base layer.

13. The mat of claim 1 wherein said acoustic absorbing layer is formed of an acoustically absorptive material selected from the group consisting of a foamed material and a fiber material.

14. The mat of claim 13 wherein said acoustically absorptive material is selected from the group consisting of open cell, polyether polyurethane foam, polypropylene foam, reticulated foam, natural fiber batt, synthetic fiber batt, glass fiber batt, non-woven carpet, and foamed latex.

15. The mat of claim 1 wherein said acoustic absorbing layer is formed of a material that is air permeable and water-resistant.

16. The mat of claim 1 including an air permeable, water-resistant layer interposed between said acoustic absorbing layer and said face layer.

17. The mat of claim 1 wherein said base layer is formed of a moldable material selected from the group consisting of natural rubber, butadiene polymers, butadiene copolymers, isoprene polymers, isoprene copolymers, chloroprene rubbers, polyvinyl chloride, polyethylene, ethylene vinyl acetate, polypropylene, polystyrene, thermoplastic rubber, thermoplastic olefins, styrene butadiene block copolymers, and blends and copolymers thereof.

18. The mat of claim 1 wherein said face layer is formed of a decorative material selected from the group consisting of carpet, fabric and non-woven material.

19. A multi-layer mat comprising:
   a) a first layer having an exposure hole defined therein;
   b) a second layer disposed adjacent said first layer; and
   c) a decorative layer interposed between said first layer and said second layer, said decorative layer including an exposed portion extending across said exposure hole;
   d) wherein said first layer is bonded to said decorative layer.

20. The mat of claim 19 including a plurality of said exposure holes defined in said first layer and a plurality of said exposed portions of said decorative layer each extending across a respective one of said exposure holes and being arranged in a decorative pattern.

21. The mat of claim 19 including an edge section defining a channel.

22. A method for forming a multi-layer acoustically absorptive mat, said method comprising:
   a) providing a moldable base layer, a face layer and an acoustic absorbing layer;
   b) placing the acoustic absorbing layer between the base layer and the face layer; and
   c) joining the base layer to the acoustic absorbing layer such that the base layer is bonded to the acoustic absorbing layer and an exposed portion of the acoustic absorbing layer extends across an exposure hole in the base layer.

23. The method of claim 22 wherein said step of joining the base layer to the acoustic absorbing layer includes heating and thereby molding the base layer to the acoustic absorbing layer.

24. The method of claim 23 wherein said step of joining the base layer to the acoustic absorbing layer further includes cooling the face layer to maintain the face layer below a temperature at which the face layer becomes permanently deformed.

25. The method of claim 23 including the step of preforming the exposure hole in the base layer prior to said step of joining the base layer to the acoustic absorbing layer.

26. The method of claim 23 including the step of forming a slug in the base layer during said step of molding and thereafter removing the slug to form the exposure portion.

27. The method of claim 23 including the step of directly bonding the base layer to the face layer.

28. The method of claim 27 wherein said step of directly bonding the base layer to the face layer includes forming a border that surrounds at least a portion of the acoustic absorbing layer and wherein the base layer is bonded to the face layer.

29. The method of claim 28 wherein said step of forming a border includes forming an edge section defining a channel.

30. The method of claim 23 wherein the acoustic absorbing layer includes a connection hole formed therein and said step of directly bonding the base layer to the face layer includes forming a connecting portion of the base layer which extends through the connection hole and bonds to the face layer.

31. The method of claim 23 wherein the acoustic absorbing layer is formed of a material defining a plurality of passages and said step of directly bonding the base layer to the face layer includes forming a plurality of connecting portions of the base layer each extending through a respective one of the passages.

32. The method of claim 23 including the step of adhering the face layer to the acoustic absorbing layer using an adhesive.

33. The method of claim 23 including the step of integrally molding a plurality of nibs extending outwardly from the base layer.

34. The method of claim 22 wherein said acoustic absorbing layer is formed of an acoustically absorptive material selected from the group consisting of a foamed material and a fiber material.

35. The method of claim 22 wherein said acoustically absorptive material is selected from the group consisting of open cell, polyether polyurethane foam, polypropylene foam, reticulated foam, natural fiber batt, synthetic fiber batt, glass fiber batt, non-woven carpet, and foamed latex.

36. The method of claim 22 wherein said base layer is formed of a moldable material selected from the group consisting of natural rubber, butadiene polymers, butadiene copolymers, isoprene polymers, isoprene copolymers, chloroprene rubbers, polyvinyl chloride, polyethylene, ethylene vinyl acetate, polypropylene, polystyrene, thermoplastic rubber, thermoplastic olefins, styrene butadiene block copolymers, and blends and copolymers thereof.

37. The method of claim 22 wherein said face layer is formed of a decorative material selected from the group consisting of carpet, fabric and non-woven material.

38. A method for forming a multi-layer mat, said method comprising:

a) providing a moldable first layer, a second layer and a decorative layer;

b) placing the decorative layer between the first layer and the second layer; and c) joining the first layer to the decorative layer such that the first layer is bonded to the decorative layer and an exposed portion of the decorative layer extends across an exposure hole in the first layer.

39. An apparatus for forming a multi-layer mat having a first layer and a second layer, the first layer having an exposure hole therein and the second layer including an exposed portion extending across the exposure hole, said apparatus comprising:

a mold plate defining a cavity configured to receive the exposed portion and an upstanding ridge adapted to separate the first layer from the exposed portion when the first layer is plasticized.

40. The apparatus of claim 39 wherein the upstanding ridge is adapted to sever a slug from a first layer insert as the first layer insert is being bonded to the second layer.

* * * * *